United States Patent
Kim

(10) Patent No.: US 6,195,596 B1
(45) Date of Patent: Feb. 27, 2001

(54) MOTION EFFECTOR CONTROLLER FOR USE IN A VIRTUAL REALITY SYSTEM

(75) Inventor: Jeoung Tae Kim, Seoul (KR)

(73) Assignee: Daewoo Electronics Co., Ltd., Seoul (KR)

(*) Notice: Subject to any disclaimer, the term of this patent is extended or adjusted under 35 U.S.C. 154(b) by 0 days.

(21) Appl. No.: 09/132,411

(22) Filed: Aug. 11, 1998

(30) Foreign Application Priority Data

Oct. 24, 1997 (KR) .................................................. 97-54884

(51) Int. Cl.[7] ...................................................... G06F 19/00
(52) U.S. Cl. .......................... 700/245; 700/245; 708/420; 708/571; 364/718
(58) Field of Search ............................. 700/245; 708/420, 708/571; 364/718, 722, 728

(56) References Cited

U.S. PATENT DOCUMENTS

| | | | | |
|---|---|---|---|---|
| 4,132,937 | * | 1/1979 | Engelberger et al. | 395/80 |
| 4,912,753 | * | 3/1990 | Evans, Jr. | 395/80 |
| 4,952,772 | * | 8/1990 | Zana | 219/124.34 |
| 4,965,499 | * | 10/1990 | Taft et al. | |
| 5,601,353 | * | 2/1997 | Naimark et al. | 353/122 |
| 5,767,648 | * | 6/1998 | Morel et al. | 318/568.1 |
| 5,768,122 | * | 6/1998 | Motoc | 364/148.05 |
| 5,919,045 | * | 7/1999 | Tagge et al. | 434/62 |
| 5,946,449 | * | 8/1999 | Dickerson et al. | 901/45 |
| 5,951,628 | * | 9/1999 | Pan et al. | 708/420 |

FOREIGN PATENT DOCUMENTS

| | | |
|---|---|---|
| 0534690 | 3/1993 | (EP) . |
| 8909953 | 10/1989 | (WO) . |
| 9220019 | 11/1992 | (WO) . |

* cited by examiner

*Primary Examiner*—Ayaz Sheikh
*Assistant Examiner*—Firmin Backer
(74) *Attorney, Agent, or Firm*—Pennie & Edmonds LLP

(57) ABSTRACT

In a motion effector for use in a virtual reality system, a plant is a target of control and for producing an output signal reflecting the actual movement of a moving part therein and a reference input provider provides a reference input signal which reflects a desired motion of the plant. In addition, a subtractor produces an error signal by subtracting the output signal from the reference input signal. A feedback compensator generates a first control signal by using the error signal and a feed-forward compensator generates a second control signal by using the reference input signal. An adder generates a final control signal by adding the first and the second control signals and provides the final control signal to the plant, wherein the final control signal is used to control the plant.

14 Claims, 3 Drawing Sheets

MOTION EFFECTOR CONTROLLER FOR USE IN A VIRTUAL REALITY SYSTEM

FIELD OF THE INVENTION

The present invention relates to a motion effector for use in a virtual reality system; and, more particularly, to a motion effector controller capable of reducing a time gap between an input and an output and also eliminating the harmful effects caused by external disturbances and modeling errors.

BACKGROUND OF THE INVENTION

An effector is a kind of hardware that allows a user to experience a virtual reality, i.e., a device that stimulates human senses to create a feeling of presence in a virtual world. That is, a motion effector or a motion simulator allows a user, sitting on an entertainment chair fixed but moving in synchronism with varying scenes projected on a full-sighted screen, to feel real while he or she, watching the screen, is stirring, shifting or rotating the entertainment chair.

Such movement of the entertainment chair may be driven by a hydraulic mechanism which works under the control of a motion effector controller.

A schematic diagram of a conventional motion effector 100 is given in FIG. 1 and details of the plant 140 shown in FIG. 1 are shown in FIG. 2.

The conventional motion effector 100 comprises: a reference provider 110, a subtractor 120, a PID (proportional integral derivative) controller 130 and a plant 140.

The reference provider 110 serves to feed a reference input R(t) which is an electrical signal reflecting a desired movement of the entertainment chair. The subtractor 120 produces an error signal E(t) by subtracting an output signal Y(t) from the reference input R(t). As a controller or compensator, the PID controller 130 manipulates the error signal E(t) so as to produce a control signal U(t). The plant 140 has a moving part therein including the entertainment chair; and is the target of the control by the motion effector controller.

FIG. 2 illustrates details of the plant 140 shown in FIG. 1. The plant 140 includes: a first AMP (amplifier) 141, a hydraulic mechanism 142 used as an actuator, a motion simulator 143, a sensor 144 and a second AMP 145.

The first AMP 141 magnifies the intensity of the control signal U(t) to a proper level to be used to control the hydraulic mechanism 142. The hydraulic mechanism 142 has therein hydraulic pumps, valves and a reservoir (which are not shown) for use in driving the motion simulator 143. The motion simulator 143, presented as the entertainment chair herein, is made to move according to the operation of the hydraulic mechanism 142. The sensor 144 detects the movement of the motion simulator 143 to generate an electrical signal reflecting the detected movement of the motion simulator 143. The electrical signal is finally used in the feedback as illustrated in FIG. 1 after being amplified at the second AMP 145.

The operation of the conventional motion effector 100 will now be described.

The error signal reflecting the difference between the reference input R(t) representing the motion that the motion simulator 143 is expected to make and the output signal Y(t) fed back from the plant 140 to the subtractor 120 is provided to the PID controller 130. So as to compensate the error between the reference input R(t) and the output signal Y(t), the error signal E(t) is manipulated at the PID controller 130 and then transformed into the control signal. The control signal produced at the PID controller 130 is a function of the error signal E(t) and represented by:

$$U(t) = K_P E(t) + K_D \frac{dE(t)}{dt} + K_I \int E(t)dt, \qquad \text{Eq. 1}$$

wherein, $K_P$, $K_D$ and $K_I$ are a proportional gain, a differential gain and an integral gain, respectively.

The control signal U(t) is applied to the hydraulic mechanism 142 to be used in controlling the hydraulic mechanism 142 after undergoing an amplification at the first AMP 141. The hydraulic mechanism 142 drives the motion simulator 143 in such a manner that the motion simulator 143 incessantly traces the desired movement represented by the reference input R(t) under the control of the PID controller 130. The sensor 144 transforms the movement of the motion simulator 143 into an electrical signal. The output signal Y(t) produced as a result of applying the control signal U(t) is used in the subtraction at the subtractor 120 to thereby produce the error signal E(t). Continuous feedbacks enable the PID controller 130 to finally control the movement of the motion simulator 143 to thereby trace the desired movement.

Albeit popular, however, the PID controller 130 has inherent deficiencies to be used in the motion effector: it provides little countermeasure against the time gap between the reference input R(t) and the output signal Y(t), which may lessen the sense of reality of the user; and, further, such factors as external disturbances, modeling errors, sensor noises, etc. cannot be fully considered and compensated by using the PID controller 130.

Accordingly, there has existed a need to develop a controller capable of provicing a higher degree of sense of reality to the user.

SUMMARY OF THE INVENTION

It is, therefore, a primary object of the present invention to provide a motion effector controller capable of reducing a time gap between an input and an output and also eliminating harmful effects caused by external disturbances, modeling errors and the like.

In accordance with the present invention, there is provided a motion effector for use in a virtual reality system, comprising: a plant for producing an output signal reflecting the actual movement of a moving part therein; means for providing a reference input signal which reflects a desired motion of the plant; subtracting means for producing an error signal by subtracting the output signal from the reference input signal; first compensating means for generating a first control signal by using the error signal; second compensating means for generating a second control signal by using the reference input signal; and adding means for generating a final control signal by adding the first and the second control signals and providing the final control signal to the plant, wherein the final control signal is used to control the plant.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENTS

A preferred embodiment in accordance with the present invention will now be described in detail with reference to FIG. 3 as well as to FIG. 2.

Figure 3:
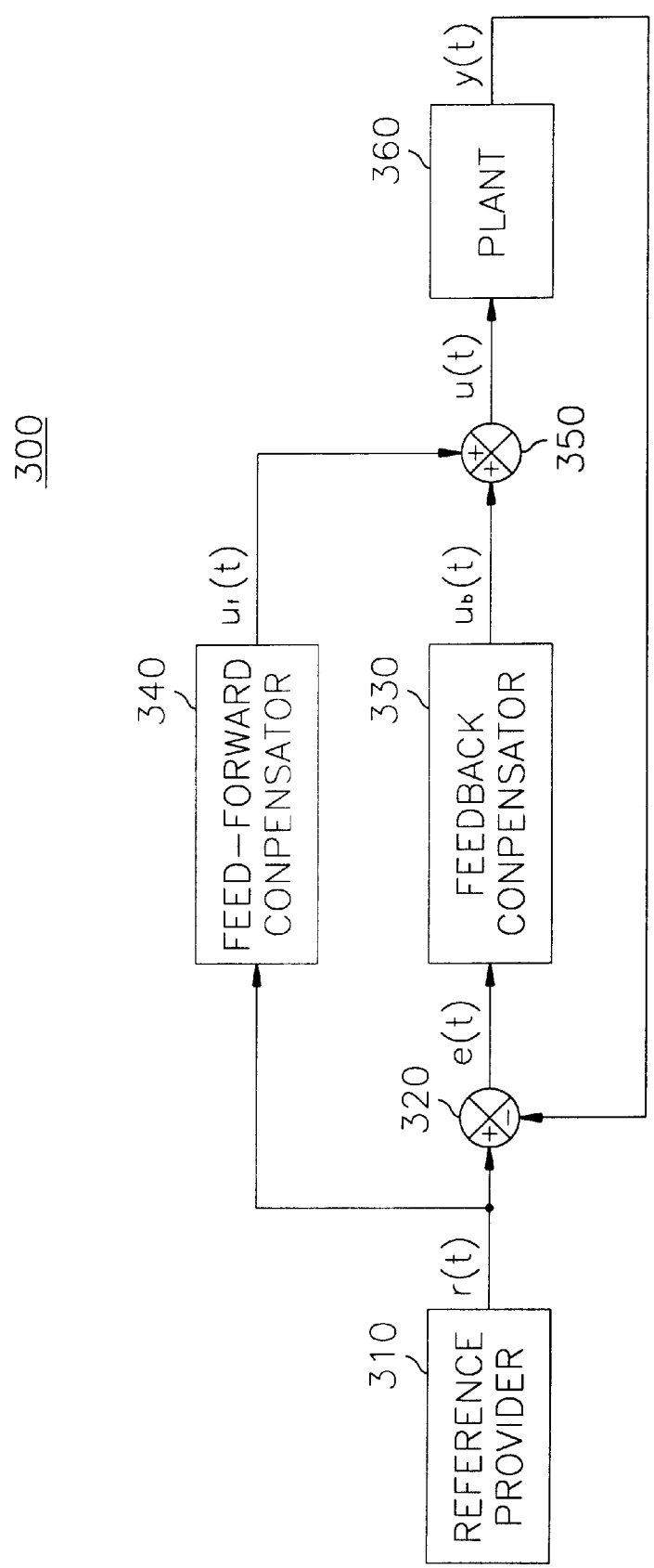
FIG. 3 illustrates a schematic diagram of the inventive motion effector.

As shown in FIG. 3, a motion effector 300 in accordance with the present invention comprises a reference provider 310, a subtractor 320, a feedback compensator 330, a feed-forward compensator 340, an adder 350 and a plant 360.

Figure 1:
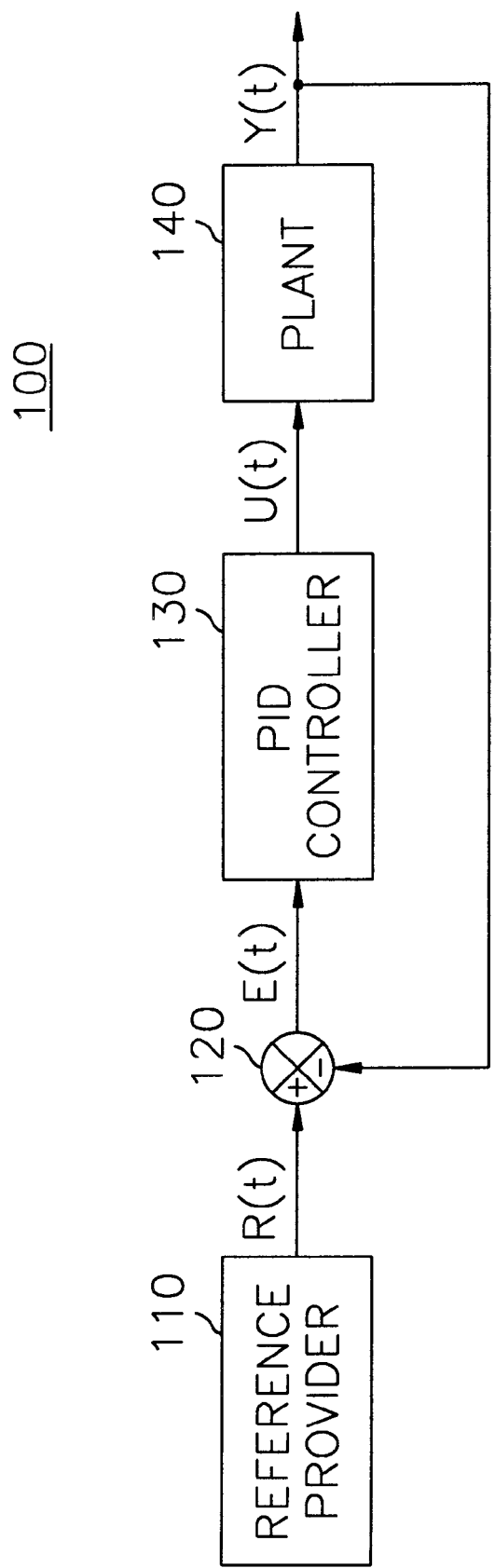
FIG. 1 describes a schematic diagram of a conventional motion effector.
Figure 2:
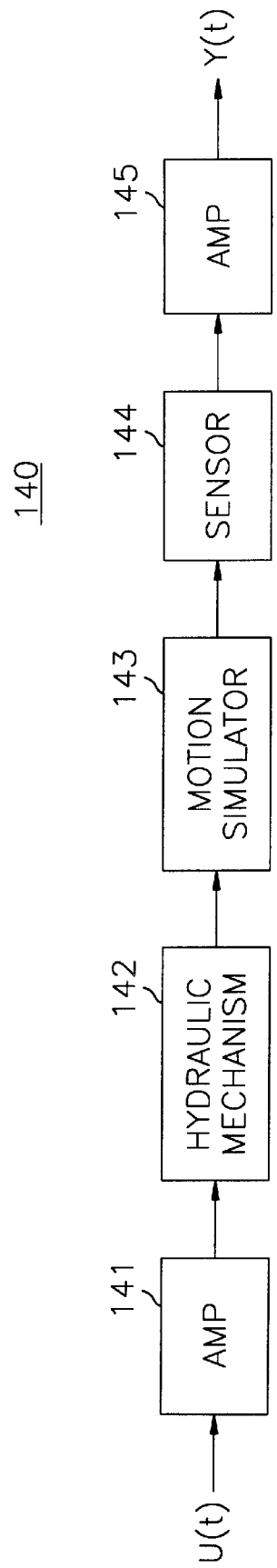
FIG. 2 presents in detail the plant shown in FIG. 1.

FIG. 2 shows details of the plant 360 shown in FIG. 3. The plant 360 includes a first AMP(amplifier) 141, a hydraulic mechanism 142, a motion simulator 143, a sensor 144 and a second AMP 145.

The reference provider 310 serves to feed a reference input r(t) reflecting a desired movement of the motion simulator 143. The subtractor 320 produces an error signal e(t) by subtracting an output signal y(t) from the reference input r(t). The feedback compensator 330 receives the error signal e(t) as the input thereto and generates a feedback control signal $u_b(t)$ as the output therefrom. The feed-forward compensator 340 receives the reference input r(t) as the input thereto and generates a feed-forward control signal $u_f(t)$ as the output therefrom. The adder 350 sums the two control signals, i.e., the feedback control signal $u_b(t)$ and the feed-forward control signal $u_f(t)$, to thereby generate a control signal u(t). The plant 360 is a moving part in the motion effector, i.e., the target of the control.

The first AMP 141 magnifies the intensity of the control signal u(t) to a proper level to be used to control the hydraulic mechanism 142. The hydraulic mechanism 142 has therein hydraulic pumps, valves, cylinders and a reservoir (each not shown) for use in driving the motion simulator 143. The motion simulator 143 is made to move by the operation of the hydraulic mechanism 142. The sensor 144 detects the movement of the motion simulator 143 to generate an electrical signal reflecting the detected movement of the motion simulator 143. The electrical signal is finally used in the feedback as illustrated in FIG. 3 after being amplified at the second AMP 145.

The feedback compensator 330 serves to minimize a performance index within a frequency range in which the influence of external disturbances prevails. The minimization of the performance index can be achieved by putting a weight onto the frequency range of the reference input r(t) and the external disturbances.

The performance index is expressed by Eq. 2:

$$J = \|X(Z^{-1})\|_\infty \qquad \text{Eq. 2}$$

Eq. 2 can also be expressed as:

$$J = \frac{1}{2\pi j} \oint_{|z|=1} X(Z^{-1}) \sum X(Z^{-1}) \frac{dz}{z}, \qquad \text{Eq. 3}$$

wherein $X(Z^{-1})$ is expressed by:

$$X(Z^{-1}) = Q_c \Phi_{ee} + G_c^* \Phi_{ue} + R_c \Phi_{uu} \qquad \text{Eq. 4}$$

wherein '*' denotes the adjoint, i.e., the transpose of the cofactor matrices, $Q_c$, $G_c$ and $R_c$ are the weighing factors, respectively; $\Phi_{ee}$, $\Phi_{ue}$ and $\Phi_{uu}$ represent the frequency spectrum of the inner product of the error signals, the frequency spectrum of the product of the control signal and the error signal, and the frequency spectrum of the inner product of the control signals, respectively. Functions $\Sigma(Z^{-1})$ and $\Sigma(Z^{-1})^*$ satisfy the following conditions expressed by:

$$\Sigma(Z^{-1}) = \Sigma(Z^{-1})^* > 0 \qquad \text{Eq. 5}$$

The transfer function of the feedback compensator 330 minimizing the performance index can be represented by:

$$H_b(z^{-1}) = \frac{1 + b_1 z^{-1} + b_2 z^{-2}}{a_0 + a_1 z^{-1} + a_2 z^{-2}}, \qquad \text{Eq. 6}$$

wherein $a_0$, $a_1$, $a_2$, $b_1$ and $b_2$ are real coefficients and z is the complex variable of the well-known z transform.

The feedback compensator 330 generates the feedback control signal $u_b(t)$ which is related in enhancing the robustness of the plant 360, wherein the robustness may be expressed in terms of the external disturbances and modeling errors.

The transfer function of the feed-forward compensator 340 is the reciprocal to that of the plant 360; that is, expressed as follows:

$$H_f(z^{-1}) = \frac{bz^{-1}}{1 + az^{-1}} \qquad \text{Eq. 7}$$

since the transfer function of the plant can be represented by:

$$G(z^{-1}) = \frac{1 + az^{-1}}{bz^{-1}}, \qquad \text{Eq. 8}$$

wherein a and b are real coefficients and z is the complex variable according to the well-known z transform.

The feed-forward control signal $u_f(t)$ is represented by:

$$u_f(t-1) = \frac{r(t) + ar(t-1)}{b}. \qquad \text{Eq. 9}$$

As shown in Eq. 9, the feed-forward control signal $u_f(t)$ uses a future reference input r(t+1) as the input thereto, and, therefore, is capable of reducing a time difference or a time delay between the output signal y(t) and the reference input r(t).

The feed-forward control signal $u_f(t)$ and the feedback control signal $u_b(t)$ are added together at the adder 350 to thereby be applied to the plant 360.

The operation of the preferred embodiment in accordance with the present invention will now be described in detail with reference to FIGS. 2 and 3.

The reference provider 310 generates the reference input r(t) which reflects a desired movement of the motion simulator 143. The reference input r(t) is provided to the (+) terminal of the subtractor 320. The subtractor 320 receives the output signal y(t) as the (−) input thereto so as to produce the error signal e(t) by subtracting the output signal y(t) from the reference input r(t).

The error signal e(t) generated at the subtractor 320 is transmitted to the feedback compensator 330 in which the feedback control signal $u_b(t)$ is generated. The feedback control signal $u_b(t)$ contributes to enhance the robustness of the plant 360 expressed in terms of the external disturbances and the modeling errors. In other words, the feedback compensator 330 is capable of achieving a higher degree of performance by minimizing the performance index.

On the other hand, the feed-forward control signal $u_f(t)$ is generated at the feed-forward compensator 340 having the transfer function represented by Eq. 7. The feed-forward control signal $u_f(t)$ contributes to enhance the sense of reality of the user since it helps to narrow a time gap between the reference input r(t) and the output signal y(t).

An addition of the feed-forward control signal $u_f(t)$ to the feedback control signal $u_b(t)$ at the adder 350 yields the control input u(t) which is used to directly control the hydraulic mechanism 142.

The first AMP 141 receives the control input u(t) and amplifies it up to a certain level high enough to operate the hydraulic mechanism 142, and, then, the amplified control input is used to operate the hydraulic mechanism 142.

According to the hydraulic pressure applied to the hydraulic reservoir (not shown), the hydraulic fluid flows in and out of the hydraulic reservoir, which makes the cylinders (not shown) to move back and forth, and, as a result of the movement of the cylinders, the motion simulator 143 moves. The hydraulic mechanism 142 described in the above can be replaced with electrical motors or other dynamic mechanisms.

Subsequently, the sensor 144 transforms the movement of the motion simulator 143 into an electrical signal. The electrical signal reflecting the displacement of the motion simulator 143 is provided to the second AMP 145 to be amplified to a proper level to be compared with the reference input r(t). The amplified signal is applied to the subtractor 320. The difference between the output signal y(t) and the reference input r(t), i.e., the error signal e(t), is fed to the feedback compensator 330 to be transformed into the feedback control signal $u_b(t)$. The feed-forward compensator 340 generates the feed-forward control signal $u_f(t)$ by transforming the reference input r(t). The two control signals, $u_b(t)$ and $u_f(t)$, are added at the adder 350 to produce the control input u(t) which finally actuates the plant 360. As shown in the above, a series of the feedback, feed-forwarding, actuating, sensing, etc. are continuously repeated so that the output signal y(t) can exactly trace the reference input r(t).

It should be noted that the feedback compensator 330 serves also to suppress the inherent instability of the feed-forward compensator 340 as well as the harmful effects due to the external disturbances, modeling errors, etc.

In summary, ill effects due to the external disturbances and modeling errors and due to the inherent instability nature of the feed-forward compensator 340 can be eliminated by using the feedback compensator 330; and reducing the time gap between the reference input and the output signal is the major role of the feed-forward compensator 340. The inventive controller using both the feedback compensator 330 and the feed-forward compensator 340 allows the motion simulator 143 to perform a fast and accurate tracking of the desired motion to thereby provide a higher quality of virtual reality.

While the present invention has been described with respect to the preferred embodiments, other modifications and variations may be made without departing from the scope and spirit of the present invention as set forth in the following claims.

What is claimed is:

1. A motion effector for use in a virtual reality system, comprising:
    a plant for producing an output signal reflecting actual movement of a moving part therein;
    means for providing a reference input signal which reflects a desired motion of the plant;
    subtracting means for producing an error signal by subtracting an output signal from the reference input signal, wherein the output signal is generated from the plant and reflects the actual movement of the plant;
    first compensating means for generating a first control signal by using the error signal;
    second compensating means for generating a second control signal by using the reference input signal; and
    adding means for generating a final control signal by adding the first and the second control signals and providing the final control signal to the plant, wherein:
        the first compensating means is capable of reducing external disturbances to the motion effector and the modeling ciTors of the motion effector and stabilizing the second compensating means,
        the second compensating means is capable of reducing the time gap between the reference input signal and the output signal, and
        the first compensating means is characterized by the function $H_b(z^{-1})$ represented by:

$$H_b(z^{-1}) = \frac{1 + b_1 z^{-1} + b_2 z^{-2}}{a_0 + a_1 z^{-1} + a_2 z^{-2}},$$

wherein $a_0$, $a_1$, $a_2$, $b_1$ and $b_2$ are real coefficients and z is the complex variable according to the z transform.

2. The motion effector of claim 1, wherein the second compensating means is characterized by the function $H_f(z^{-1})$ represented by:

$$H_f(z^{-1}) = \frac{bz^{-1}}{1 + az^{-1}}$$

wherein a and b are real coefficients.

3. The motion effector of claim 2, wherein the plant includes: a first amplifier for receiving and amplifying the final control signal; an actuator controlled by the amplified final control signal; a motion simulator as the moving part driven by the actuator; a sensor for generating the output signal by sensing the movement of the motion simulator and converting the movement into an electrical signal; and a second amplifier for amplifying the electrical signal to produce the output signal.

4. The motion effector of claim 3, wherein the actuator is operated by using a hydraulic mechanism.

5. The motion effector of claim 4, wherein the hydraulic mechanism has hydraulic pumps, valves, cylinders and a reservoir therein.

6. The motion effector of claim 3, wherein the actuator is operated by using electrical motors.

7. The motion effector of claim 6, wherein the motion simulator is an entertainment chair to sit on, to thereby allow a user to feel a movement in synchronism with a display on a screen.

8. A motion effector for use in a virtual reality system, comprising:
    a plant configured to produce an output signal reflecting actual movement of a moving part therein;
    a reference provider configured to provide a reference input signal which reflects a desired motion of the plant;
    a subtractor configured to produce an error signal by subtracting the output signal from the reference input signal,
    a first compensator configured to generate a first control signal by using the error signal;

a second compensator configured to generate a second control signal by using the reference input signal; and an adder configured to generate a final control signal by adding the first and the second control signals and to provide the final control signal to the plant, wherein the final control signal is used to control the plant, wherein:

the first compensator is capable of reducing external disturbances to the motion effector and the modeling errors of the motion effector and stabilizing the second compensator, the second compensator is capable of reducing the time gap between the reference input signal and the output signal, and the first compensator is characterized by the function $H_b(z^{-1})$ represented by:

$$H_b(z^{-1}) = \frac{1 + b_1 z^{-1} + b_2 z^{-2}}{a_0 + a_1 z^{-1} + a_2 z^{-2}},$$

wherein $a_0$, $a_1$, $a_2$, $b_1$ and $b_2$ are real coefficients and z is the complex variable according to the z transform.

9. The motion effector of claim 8, wherein the second compensator is characterized by the function $H_f(z^{-1})$ represented by:

$$H_f(z^{-1}) = \frac{bz^{-1}}{1 + az^{-1}}$$

wherein a and b are real coefficients.

10. The motion effector of claim 9, wherein the plant includes: a first amplifier for receiving and amplifying the final control signal; an actuator controlled by the amplified final control signal; a motion simulator as the moving part driven by the actuator; a sensor for generating the output signal by sensing the movement of the motion simulator and converting the movement into an electrical signal; and a second amplifier for amplifying the electrical signal to produce the output signal.

11. The motion effector of claim 10, wherein the actuator is operated by using a hydraulic mechanism.

12. The motion effector of claim 11, wherein the hydraulic mechanism has hydraulic pumps, valves, cylinders and a reservoir therein.

13. The motion effector of claim 10, wherein the actuator is operated by using electrical motors.

14. The motion effector of claim 13, wherein the motion simulator is an entertainment chair to sit on, to thereby allow a user to feel a movement in synchronism with a display on a screen.

* * * * *